United States Patent
Javid et al.

(10) Patent No.: US 10,679,436 B2
(45) Date of Patent: Jun. 9, 2020

(54) VEHICLE SUSPENSION SYSTEM ALIGNMENT MONITORING

(71) Applicant: GM Global Technology Operations LLC, Detroit, MI (US)

(72) Inventors: Fahim Javid, Pickering (CA); Hojjat Izadi, Toronto (CA); Joseph K. Moore, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/001,481

(22) Filed: Jun. 6, 2018

(65) Prior Publication Data

US 2019/0164363 A1   May 30, 2019

Related U.S. Application Data

(63) Continuation of application No. 15/823,814, filed on Nov. 28, 2017.

(51) Int. Cl.
| | |
|---|---|
| *G07C 5/08* | (2006.01) |
| *B62D 15/02* | (2006.01) |
| *G01M 17/06* | (2006.01) |
| *B62D 5/04* | (2006.01) |

(52) U.S. Cl.
CPC ......... *G07C 5/0808* (2013.01); *B62D 5/0481* (2013.01); *B62D 15/021* (2013.01); *G01M 17/06* (2013.01); *G07C 5/0816* (2013.01)

(58) Field of Classification Search
CPC .. G07C 5/0808; G07C 5/0816; B62D 5/0481; B62D 15/021; G01M 17/06

USPC ........................................................ 701/34.4
See application file for complete search history.

(56) References Cited

U.S. PATENT DOCUMENTS

| | | | |
|---|---|---|---|
| 6,043,875 A | 3/2000 | Samuelsson | |
| 6,965,820 B2* | 11/2005 | Amberkar | B62D 5/0472 180/443 |
| 2002/0188389 A1 | 12/2002 | Ashrafi | |
| 2013/0190969 A1* | 7/2013 | Harrill | G01B 21/26 701/34.4 |
| 2013/0226412 A1* | 8/2013 | Kunihiro | B62D 6/007 701/42 |

(Continued)

*Primary Examiner* — Peter D Nolan
*Assistant Examiner* — Luat T Huynh
(74) *Attorney, Agent, or Firm* — Cantor Colburn LLP

(57) ABSTRACT

Examples of techniques for vehicle suspension system alignment monitoring are disclosed. In one example implementation, a method includes receiving vehicle data and environmental data including, inertial measurement unit (IMU) acceleration data and global positioning system (GPS) velocity data from a GPS associated with the vehicle, and steering wheel angle data, driver applied torque data, and electronic power steering (EPS) applied torque data associated with the steering system. The method further includes mitigating for at least one of a vehicle effect and an environmental effect based on the vehicle data and environmental data. The method further includes detecting a misalignment based at least in part on one or more of the IMU acceleration data, the GPS velocity data, acceleration data, a steering wheel angle, and a self-aligning torque. The method further includes reporting the misalignment of the vehicle based at least in part on detecting the misalignment.

12 Claims, 13 Drawing Sheets

(56) References Cited

U.S. PATENT DOCUMENTS

| | | | |
|---|---|---|---|
| 2014/0257628 A1* | 9/2014 | Lee | B62D 5/0481 |
| | | | 701/34.4 |
| 2015/0120134 A1* | 4/2015 | Kanou | B62D 15/0245 |
| | | | 701/34.4 |
| 2015/0127214 A1* | 5/2015 | Watanabe | B60Q 1/44 |
| | | | 701/34.4 |
| 2017/0088163 A1 | 3/2017 | West et al. | |

* cited by examiner

VEHICLE SUSPENSION SYSTEM ALIGNMENT MONITORING

CROSS-REFERENCE TO RELATED APPLICATIONS

This application is a continuation of U.S. application Ser. No. 15/823,814, filed Nov. 28, 2017, entitled "VEHICLE SUSPENSION SYSTEM ALIGNMENT MONITORING," which is incorporated herein by reference in its entirety.

INTRODUCTION

The present disclosure relates generally to vehicle suspension systems and more particularly to vehicle suspension system alignment monitoring and misalignment detection.

A vehicle, such as a car, a motorcycle, or any other type of automobile can be equipped with a suspension system. A vehicle suspension system includes, for example, tires, tire air, springs, shock absorbers, and linkages that connect a vehicle to its wheels. The vehicle suspension system improves ride quality while providing for vehicle handling.

A steering system of a vehicle enables a driver to steer wheels of the vehicle. The steering system can be an electric power steering system that uses an electric motor to provide a steering assist to a driver of the vehicle, thereby reducing effort by the driver in steering the vehicle.

In most vehicles, when the wheels are aligned straight, the steering wheel is oriented such that the spokes of the steering wheel appear level in a home or neutral position. In some instances, the steering wheel may become misaligned during vehicle assembly or in the field, that is, the spokes of the steering wheel are no longer in the home or neutral position. Noticeable deviations from the home or neutral position are typically undesirable to a driver.

In some instances, the steering wheel may be aligned, but the vehicle may become misaligned. For example, the steering wheel is no longer in the home or neutral position when the vehicle is traveling straight. Vehicle misalignment is typically undesirable to a driver.

SUMMARY

In one exemplary embodiment, a computer-implemented method for detecting thrust misalignment of a vehicle is provided. The method includes receiving, by a processing device, vehicle data and environmental data including, inertial measurement unit (IMU) acceleration data and global positioning system (GPS) velocity data from a GPS associated with a vehicle, and steering wheel angle data, driver applied torque data, and electronic power steering (EPS) applied torque data associated with the steering system. The method further includes mitigating, by a processing device, for at least one of a vehicle effect and an environmental effect based on the vehicle data and environmental data. The method further includes detecting, by the processing device, a misalignment based at least in part on one or more of the IMU acceleration data, the GPS velocity data, acceleration data, a steering wheel angle, and a self-aligning torque. The method further includes reporting the misalignment of the vehicle based at least in part on detecting the misalignment.

In some examples, the misalignment is a thrust misalignment. In some examples, the misalignment is a toe misalignment. In some examples, the misalignment is a camber misalignment. In some examples, the misalignment is a caster misalignment. In some examples, the misalignment is a steering wheel misalignment. In some examples, the vehicle effect is selected from the group consisting of a speed, a yaw rate, a load on a vehicle, a trajectory, a tire pressure, and a tire wear. In some examples, the environmental effect is selected from the group consisting of a road crown, a road grade, wind, a gust, humidity, and a rough road condition. In some examples, mitigating for the at least one of the vehicle effect and the environmental effect occurs when one or more of the at least one of the vehicle effect and the environmental effect exceeds a threshold. In some examples, the method includes aligning the vehicle based at least in part on detecting the misalignment. In some examples, the method includes correcting, by the processing device, a steering wheel angle for vehicle and environmental effects based at least in part on the vehicle data and the environment data. In some examples, correcting for the environmental effects comprises compensating for a road crown and grade. In some examples, correcting for the vehicle effects comprises compensating for a thrust angle, a camber angle, and a caster angle. In some examples, the method includes correcting, by the processing device, a self-aligning torque for vehicle and environmental factors. In some examples, correcting for the vehicle and environmental factors comprises compensating for a road crown and grade and a combined tire and vehicle torque.

In another exemplary embodiment, a system includes a memory including computer readable instructions and a processing device for executing the computer readable instructions for performing a method. In examples, the method includes receiving, by a processing device, vehicle data and environmental data including, inertial measurement unit (IMU) acceleration data and global positioning system (GPS) velocity data from a GPS associated with a vehicle, and steering wheel angle data, driver applied torque data, and electronic power steering (EPS) applied torque data associated with the steering system. The method further includes mitigating, by a processing device, for at least one of a vehicle effect and an environmental effect based on the vehicle data and environmental data. The method further includes detecting, by the processing device, a misalignment based at least in part on one or more of the IMU acceleration data, the GPS velocity data, acceleration data, a steering wheel angle, and a self-aligning torque. The method further includes reporting the misalignment of the vehicle based at least in part on detecting the misalignment.

In yet another exemplary embodiment a computer program product includes a computer readable storage medium having program instructions embodied therewith, wherein the computer readable storage medium is not a transitory signal per se, the program instructions executable by a processing device to cause the processing device to perform a method. In examples, the method includes receiving, by a processing device, vehicle data and environmental data including, inertial measurement unit (IMU) acceleration data and global positioning system (GPS) velocity data from a GPS associated with a vehicle, and steering wheel angle data, driver applied torque data, and electronic power steering (EPS) applied torque data associated with the steering system. The method further includes mitigating, by a processing device, for at least one of a vehicle effect and an environmental effect based on the vehicle data and environmental data. The method further includes detecting, by the processing device, a misalignment based at least in part on one or more of the IMU acceleration data, the GPS velocity data, acceleration data, a steering wheel angle, and a self-aligning torque. The method further includes reporting the misalignment of the vehicle based at least in part on detecting the misalignment.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
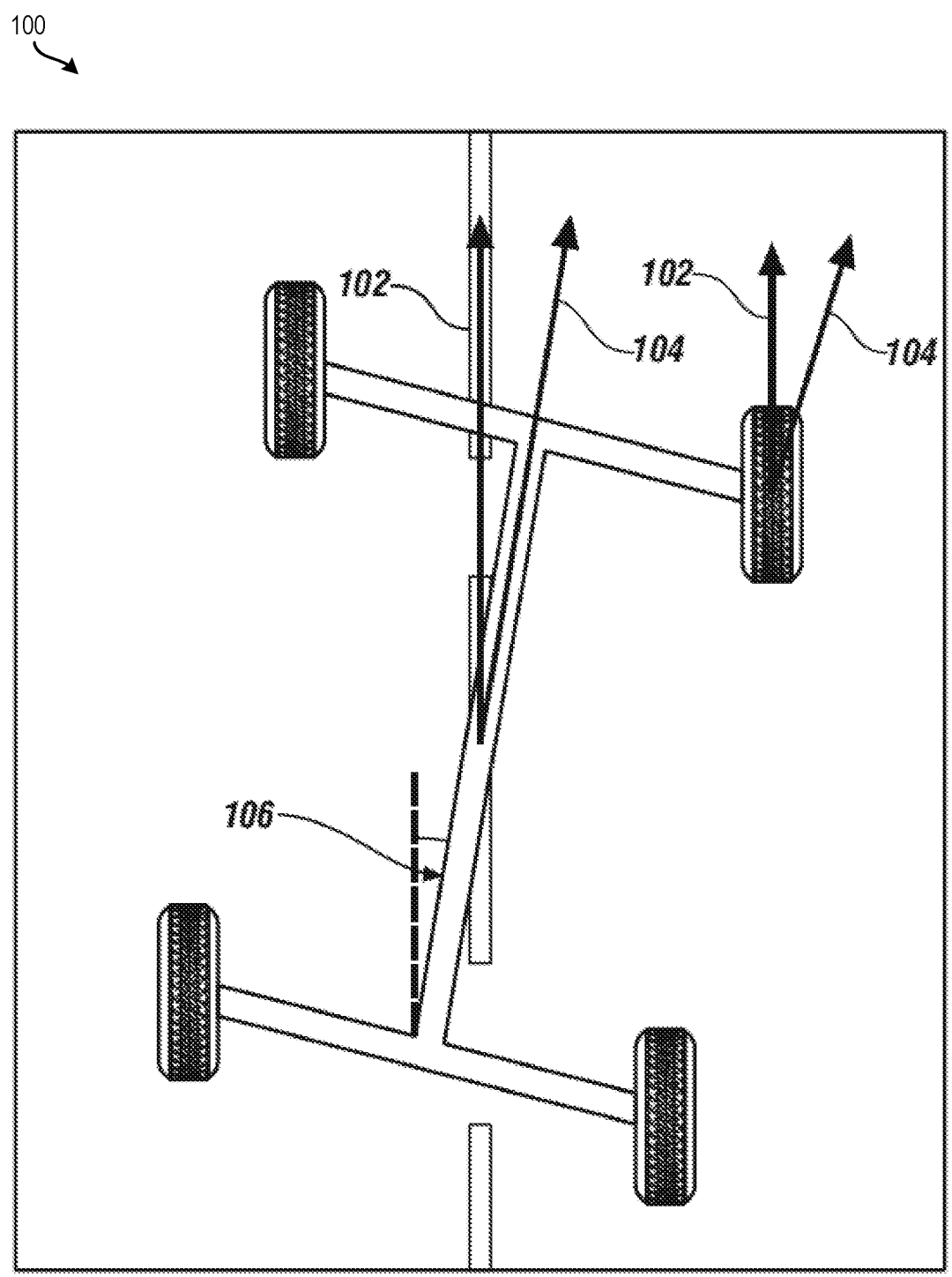
FIG. 1 depicts a diagram of a vehicle experiencing rear axle thrust misalignment, according to aspects of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for monitoring vehicle suspension system alignment and reporting the misalignments (e.g., rear axle thrust misalignment, steering wheel and front axle toe misalignment, etc.) and mitigating and compensating for environmental effects (e.g., road crown, wind, etc.) that affect misalignment detection. In particular, the present techniques provide for rear axle thrust misalignment detection, steering wheel, front axle toe, camber and caster misalignment detection, and environmental condition mitigation and compensation that affect misalignment. Accordingly, the present techniques compensate for the effect of the road crown/grade on the camber, caster and toe angle calculation using inertial measurement unit (IMU) information, mitigate environmental effects such as crosswind/gusts using weather information (e.g., received via a network connection), fuse sensory information from the IMU and a global positioning system (GPS) to detect rear axle thrust misalignment, and detect front axle toe misalignment after detecting the thrust misalignment.

Misalignment(s) can cause various problems for the vehicle and/or its operator. For example, rear axle thrust misalignment can cause a vehicle's main axle to be inclined from the vehicle travel direction when driving straight ahead, which causes different acceleration/speed readings by the IMU and GPS systems. The road crown imposes a torque on a steering rack of the vehicle because of the vehicle's lateral weight component. Misalignment(s) can cause instability of the vehicle's handling as well as excessive premature tire wear.

The technical solutions described herein enable various vehicle misalignments to be detected and addressed using existing, on-board sensors and systems in a vehicle. The technical solutions described herein provide a number of benefits. For example, the technical solutions described herein can detect thrust, toe, caster, and/or camber misalignments using existing on-board sensors without the need for additional hardware or sensors. Additionally, the present techniques can be executed automatically without driver or service professional intervention. Moreover, the technical solutions described herein can account for environmental effects such as crosswinds, road crown, humidity, and the like to report the misalignment detection techniques described herein.

FIG. 1 depicts a diagram of a vehicle 100 experiencing rear axle thrust misalignment, according to aspects of the present disclosure. As shown in FIG. 1, the direction of longitudinal acceleration 102 measured by a global positioning system (GPS) unit associated with the vehicle 100 differs from the direction of longitudinal acceleration 104 measured by an inertial measurement unit (IMU) associated with the vehicle 100. Accordingly, the vehicle 100 experiences rear axle thrust misalignment, the severity of which can be determined by the thrust angle 106. As the thrust angle 106 increases, the rear axle thrust misalignment is considered more severe.

The thrust misalignment is detected by comparing the vehicle acceleration from both the GPS and the IMU. The thrust misalignment causes a centerline of the body of the vehicle 100 to be at an angle (e.g., the thrust angle 106) with respect to the travel direction of the vehicle 100 when driving straight ahead. Since the IMU is installed on the vehicle's body, it measures the acceleration based on vehicle body orientation, not based on the current direction of travel. This causes the longitudinal and lateral accelerations measured by the IMU to be different than those based on differentiating the GPS velocity data. When the vehicle 100 is misaligned with respect to the thrust angle 106, the difference between the IMU longitudinal acceleration and true acceleration (estimated using GPS velocity data) is more noticeable during high acceleration/deceleration maneuvers. Then, for the sake of robustness, high acceleration/deceleration maneuvers can be considered with a higher importance or weight when detecting thrust misalignment.

The following equations can be used to detect thrust misalignment:

$$\frac{d(v_x^{GPS})}{dt} \ne a_{x'}^{IMU}$$

$$\frac{d(v_y^{GPS})}{dt} \ne a_{y'}^{IMU}$$

$$\overline{v}_x^{GPS} \ne \int a_{x'}^{IMU} \cdot dt$$

$$\overline{v}_y^{GPS} \ne \int a_{y'}^{IMU} \cdot dt$$

where $v_x^{GPS}$ represents vehicle longitudinal speed measured by the GPS; $a_{x'}^{IMU}$ represents longitudinal acceleration in vehicle coordinate system as measured by IMU; $v_y^{GPS}$ represents vehicle lateral speed measured by the GPS; $a_{y'}^{IMU}$ represents lateral acceleration in vehicle coordinate system as measured by IMU; $a_x^{GPS}$ represents vehicle longitudinal acceleration calculated by differentiating $v_x^{GPS}$; and $a_y^{GPS}$ represents vehicle lateral acceleration calculated by differentiating $v_y^{GPS}$. $\overline{v}_x^{GPS}$ and $\overline{v}_y^{GPS}$ represent the average vehicle longitudinal and lateral speeds, respectively, as calculated by averaging the vehicle speed data provided by GPS over a specific period of time.

The thrust angle can then be calculated using the following equation:

$$\text{Thrust Angle} = \cos^{-1}\left(\frac{a_y^{GPS} a_{y'}^{IMU} + a_x^{GPS} a_{x'}^{IMU}}{\sqrt{(a_y^{GPS})^2 + (a_x^{GPS})^2} \sqrt{(a_{y'}^{IMU})^2 + (a_{x'}^{IMU})^2}}\right).$$

In another example, by assuming the lateral acceleration measured by the GPS is zero when driving straight, the thrust angle 106 can be expressed as follows:

$$\text{Thrust Angle} = \cos^{-1}\left(\frac{a_{x'}^{IMU}}{a_x^{GPS}}\right)$$

The thrust angle can be compared to a threshold to determine whether a thrust misalignment is present. For example, if the absolute value of the thrust angle is less than a threshold, no thrust misalignment is detected; however, if the absolute value of the thrust angle is greater than (or greater than or equal to) the threshold, a thrust misalignment is detected.

Figure 2:
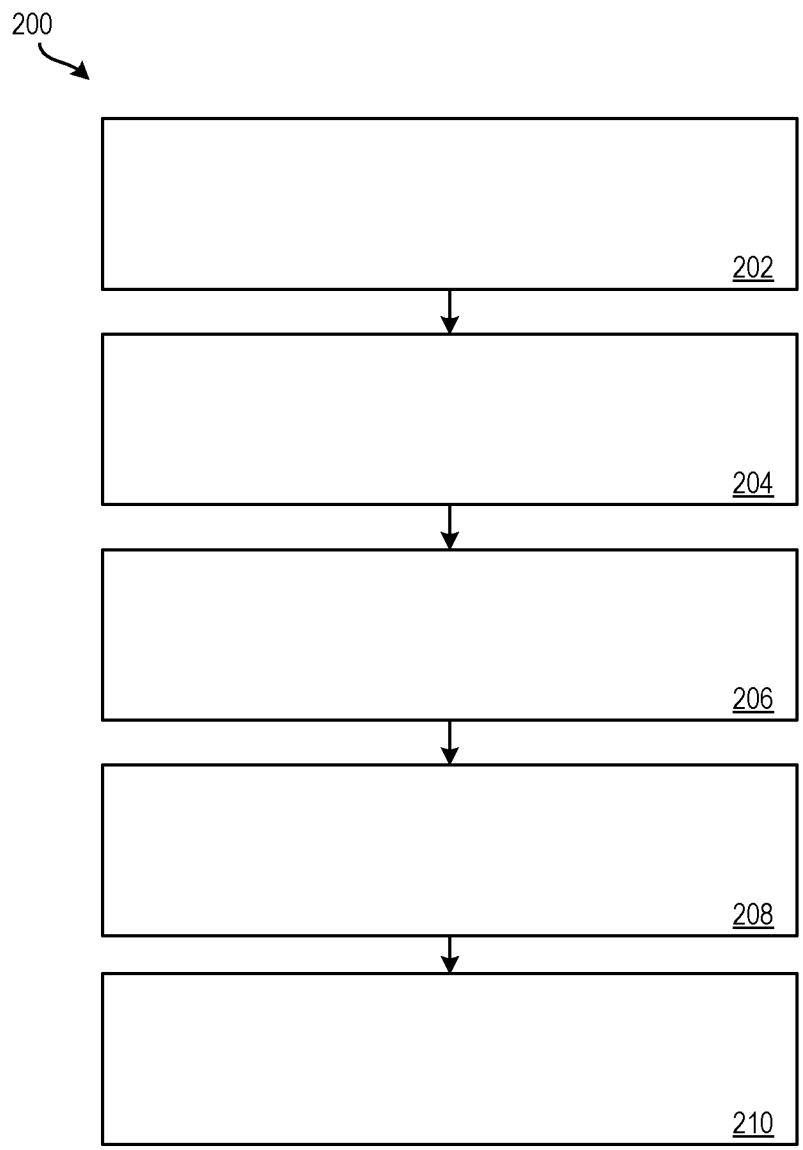
FIG. 2 depicts a flow diagram of a method for detecting thrust misalignment of a vehicle (e.g., the vehicle of FIG. 1), according to aspects of the present disclosure.

FIG. 2 depicts a flow diagram of a method 200 for detecting thrust misalignment of a vehicle (e.g., the vehicle 100), according to aspects of the present disclosure. The method 200 can be implemented by a suitable processing device or processing system, such as the processing system 1300 of FIG. 13, by an electronic steering system, or by another suitable system or device.

At block 202, a processing device (e.g., the processor 1121 of FIG. 11) receives inertial measurement unit (IMU) acceleration data from an IMU associated with the vehicle. At block 204, the processing device receives global positioning system (GPS) velocity data from a GPS associated with the vehicle. According to some examples, the IMU acceleration data and the GPS acceleration data relate to a latitudinal acceleration of the vehicle and/or a longitudinal acceleration of the vehicle.

At block 206, the processing device mitigates for driving trajectory, longitudinal acceleration, and rough road conditions as described herein. As used herein, mitigation describes a pause of the algorithm (e.g., the method 200, etc.) when one or more vehicle effects and/or environmental effects exceeds a threshold. The vehicle effects include speed, loading, trajectory, tire pressure, tire wear, etc. The environmental effects include road crown/grade, wind/gust, humidity, rough road conditions, etc. At block 208, the processing device detects a thrust misalignment based at least in part on the IMU acceleration data and the GPS velocity and acceleration data. Detecting the thrust misalignment can include calculating the thrust angle based at least in part on the IMU acceleration data and the GPS acceleration data. The thrust angle can then be compared to a threshold such that a thrust misalignment is detected when the absolute value of the thrust angle is greater than (or greater than or equal to) the threshold and a thrust misalignment is not detected when the absolute value of the thrust angle is less than the threshold.

At block 210, the misalignment of the vehicle 100 can be reported to an operator or service technician, when the thrust misalignment is detected so that the alignment can be performed. The thrust angle can be used by service technicians to align the vehicle to reduce or eliminate thrust misalignment.

Additional processes also may be included, and it should be understood that the processes depicted in FIG. 2 represent illustrations and that other processes may be added or existing processes may be removed, modified, or rearranged without departing from the scope and spirit of the present disclosure.

Figure 3:
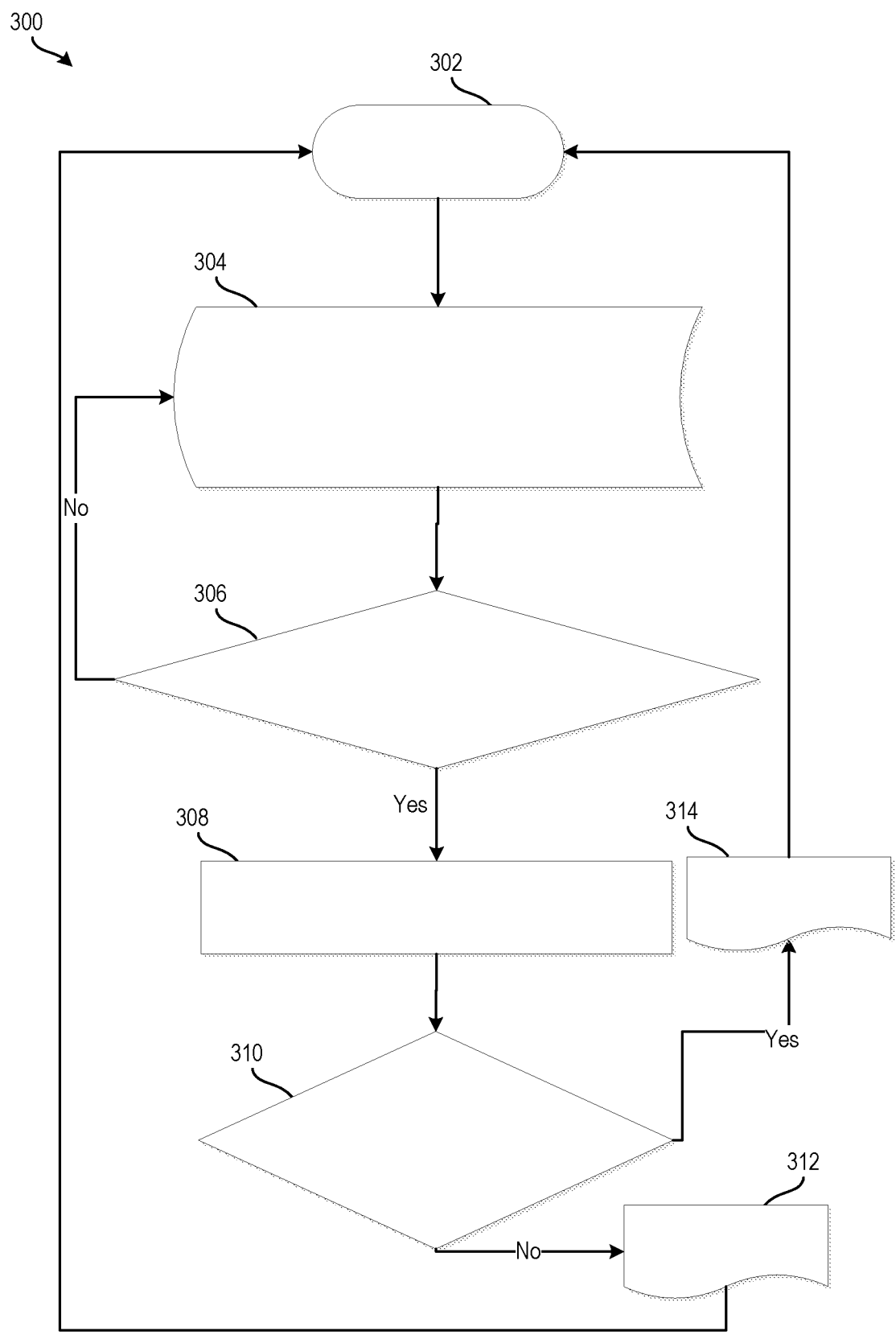
FIG. 3 depicts a flow diagram of a method for detecting thrust misalignment of a vehicle (e.g., the vehicle of FIG. 1), according to aspects of the present disclosure.

FIG. 3 depicts a flow diagram of a method 300 for detecting thrust misalignment of a vehicle (e.g., the vehicle 100), according to aspects of the present disclosure. The method 300 can be implemented by a suitable processing device or processing system, such as the processing system 1300 of FIG. 13, by an electronic steering system, or by another suitable system or device.

The thrust alignment detection is activated at block 302, and the method 300 continues to block 304. At block 304, the method 300 receives a straight-ahead driving flag, which is processed by a separate module based on IMU acceleration data, angular rates, and vehicle speed from wheel speed sensors. It also receives a rough road flag (e.g., from a separate module), the vehicle IMU accelerations, and vehicle speed as provided by vehicle GPS. At block 306, it is checked whether the straight driving condition is met. The absolute value of the acceleration data from the IMU is also compared to a variable α, which defines a threshold between a small and large acceleration. The small acceleration can be ignored as insignificant, while the large acceleration can be used as a proper condition to evaluate a thrust misalignment. At block 308, true longitudinal acceleration is calculated by taking the derivative of the vehicle speed measured by the GPS.

At block 310, the thrust angle is calculated and compared to a variable β, which defines the threshold for thrust misalignment detection as discussed herein. If the absolute value of thrust angle is less than the threshold defined by β, the thrust angle is OK at block 312. However, if the absolute value of the thrust angle exceeds the threshold defined by β, the thrust angle is misaligned at block 314. In either case, the method 300 can return to block 302 and repeat.

Additional processes also may be included, and it should be understood that the processes depicted in FIG. 3 represent illustrations and that other processes may be added or existing processes may be removed, modified, or rearranged without departing from the scope and spirit of the present disclosure.

Figure 4:
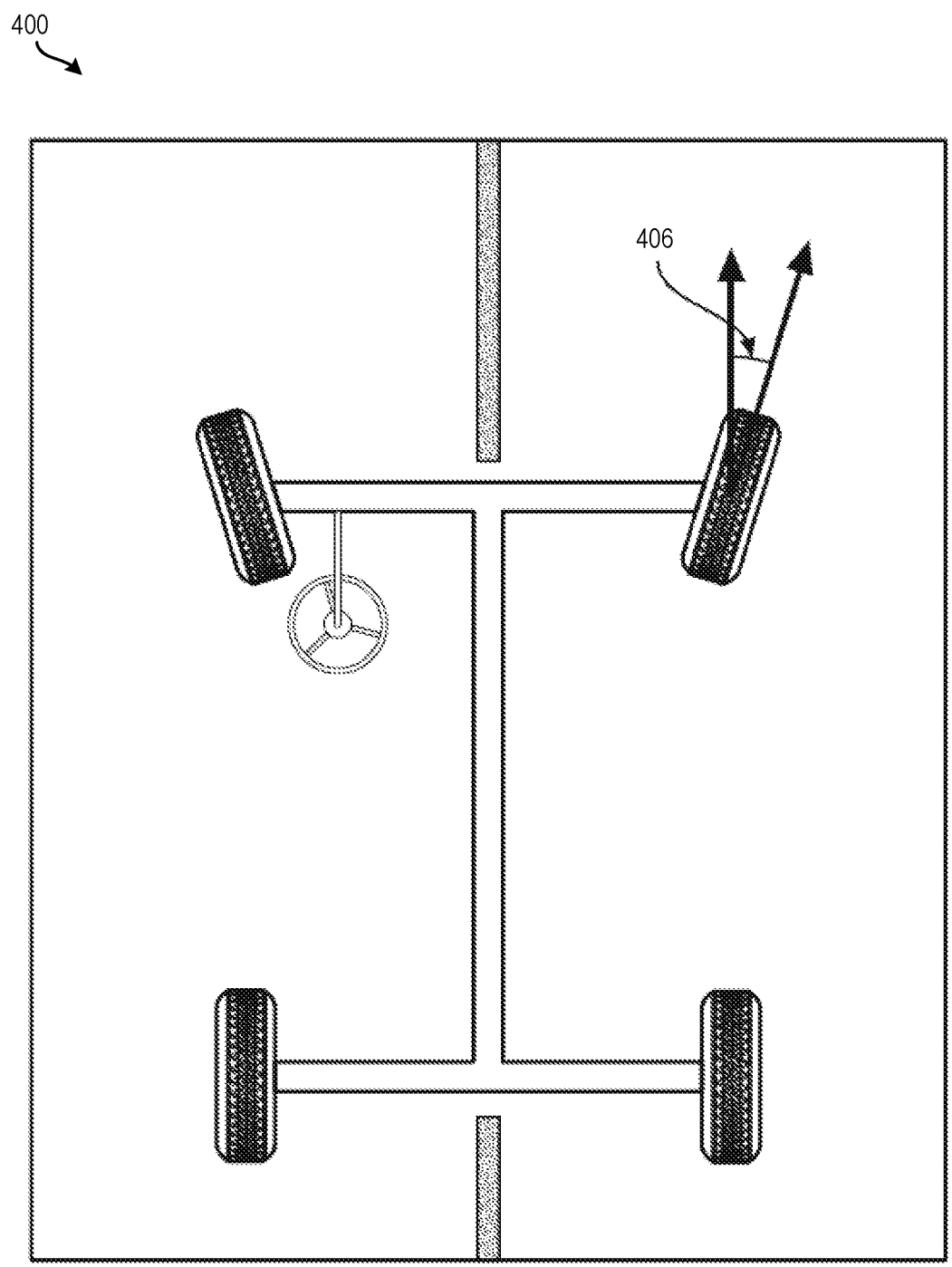
FIG. 4 depicts a diagram of a vehicle experiencing front axle toe misalignment, according to aspects of the present disclosure.

FIG. 4 depicts a diagram of a vehicle 400 experiencing front axle toe misalignment, according to aspects of the present disclosure. The combined effect of front axle toe misalignment and the steering wheel misalignment can be detected by monitoring the steering wheel angle 406 over time at straight-ahead driving condition. There are different effects that can cause steady steering wheel angle input while driving straight: road crown, thrust angle, toe misalignment, crosswind, steering wheel misalignment, etc. It should be noted that the straight-ahead driving is detected by examining the wheel speeds, GPS heading, yaw rate, etc. of the vehicle 400. By correcting road effects (as described herein) the steering wheel angle (SWA) input can be monitored over time to detect deviation/change. If thrust angle (also referred to as "dog tracking") is not detected, the deviation is due to the combined effect of the front axle toe and steering wheel misalignment and can be messaged to the customer. Otherwise, the deviation is due to the thrust angle can be taken into account to correct the measured steering wheel angle for thrust misalignment.

Figure 5:
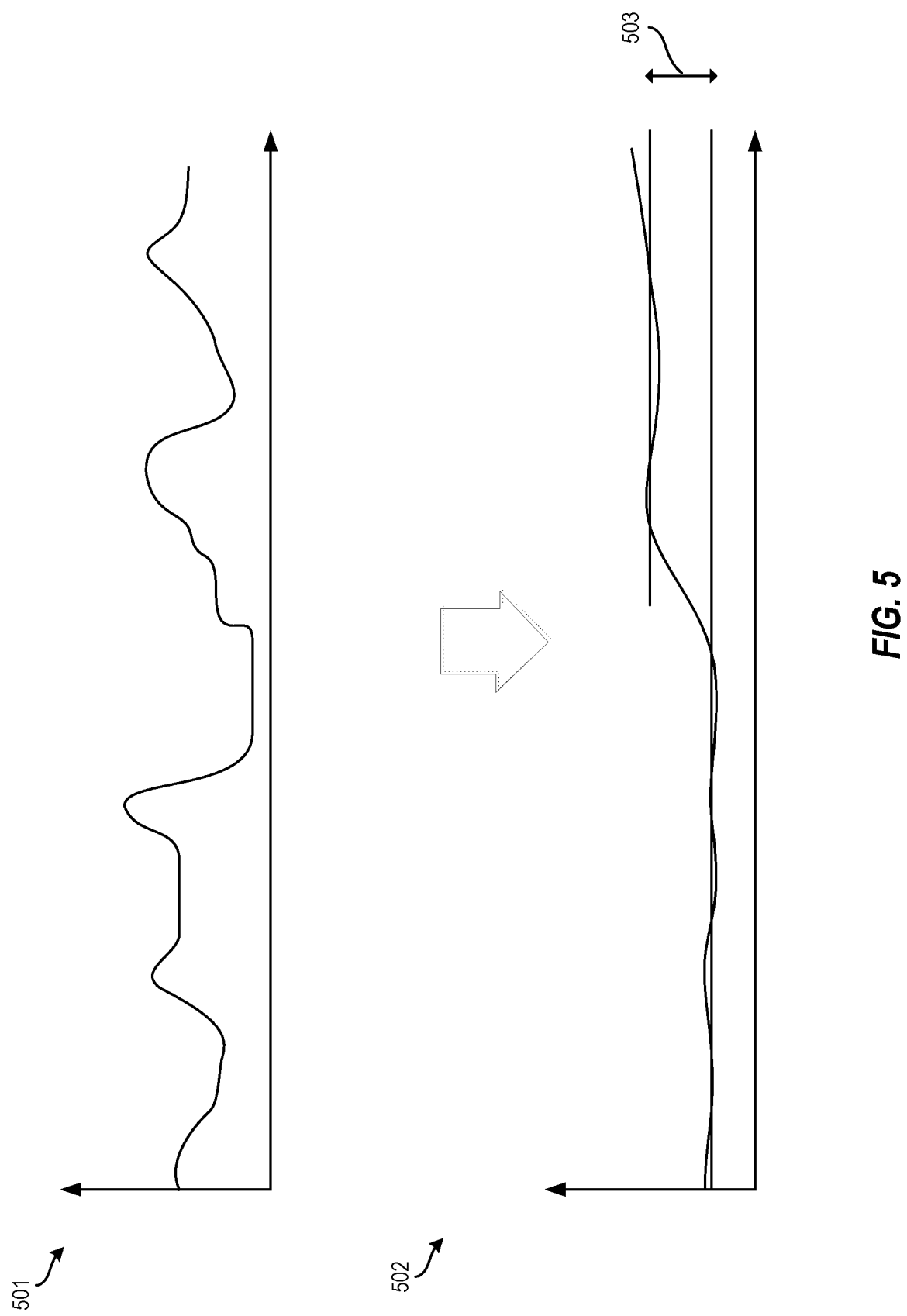
FIG. 5 depicts graphs of a steering wheel angle over time for a vehicle (e.g., the vehicle of FIG. 4), according to aspects of the present disclosure.

FIG. 5 depicts graphs 501, 502 of a steering wheel angle (e.g., the steering wheel angle 406 of FIG. 4) over time for a vehicle (e.g., the vehicle 400), according to aspects of the present disclosure. In particular, the graph 501 depicts the steering wheel angle over time, and the graph 502 depicts the steering wheel angle over time once corrected for road crown as described herein. As depicted in the graph 502, a deviation 503 detected in the steering wheel angle over time can indicate a toe angle or steering wheel misalignment. The road crown correction is used to determine whether toe misalignment is present.

Figure 6:
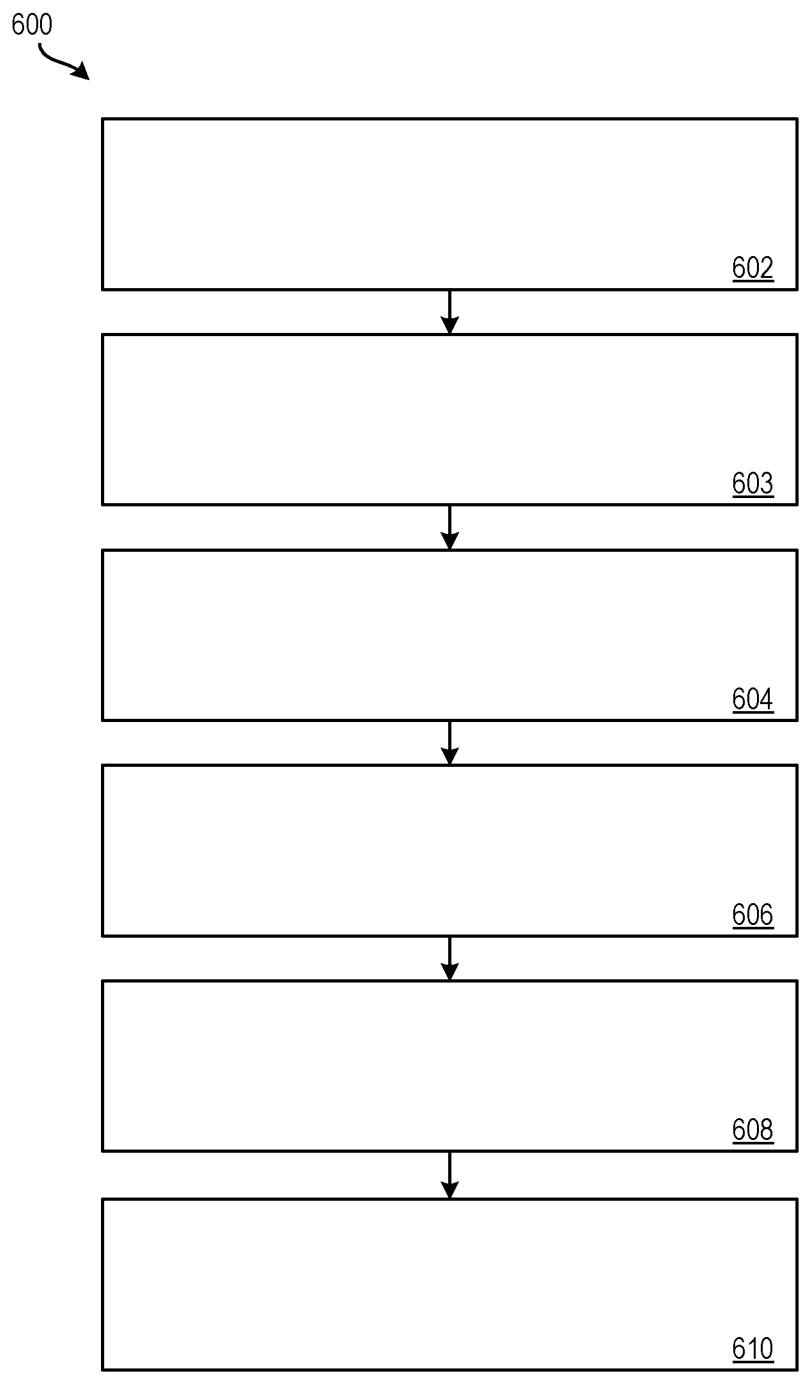
FIG. 6 depicts a flow diagram of a method for detecting toe and steering wheel misalignment of a vehicle (e.g., the vehicle of FIG. 4), according to aspects of the present disclosure.

FIG. 6 depicts a flow diagram of a method 600 for detecting toe misalignment of a vehicle (e.g., the vehicle 400), according to aspects of the present disclosure. The method 600 can be implemented by a suitable processing device or processing system, such as the processing system 1300 of FIG. 13, by an electronic steering system, or by another suitable system or device.

At block 602, a processing device (e.g., the processor 1121 of FIG. 11) receives vehicle data and environmental data. The vehicle data can include acceleration data, velocity data, yaw rate data, direction data, tire pressure, and/or an initial steering wheel angle, etc. The environmental data can include wind speed, and/or relative humidity, etc.

At block 603, the processing device mitigates for driving trajectory, longitudinal acceleration, and rough road conditions as described herein. As used herein, mitigation describes a pause of the algorithm (e.g., the method 600, etc.) when one or more vehicle effects and/or environmental effects exceeds a threshold. The vehicle effects include speed, loading, trajectory, tire pressure, tire wear, etc. The environmental effects include road crown/grade, wind/gust, humidity, rough road conditions, etc.

At block 604, the processing device corrects for road and environmental effects based on the vehicle data and environmental data as described herein. For example, correcting for the road and environmental effects can include compensating for a road crown, thrust angle, etc. At block 606, the processing device monitors a steering wheel angle over time. This can include, for example, calculating a moving average of the steering wheel angle. At block 608, the processing device detects at least one of a toe misalignment and a steering wheel misalignment based at least in part on detecting a steering wheel angle deviation over time. If a toe or steering wheel misalignment is detected, the method 600 can report misalignment of the vehicle at block 610.

Additional processes also may be included, and it should be understood that the processes depicted in FIG. 6 represent illustrations and that other processes may be added or existing processes may be removed, modified, or rearranged without departing from the scope and spirit of the present disclosure.

Figure 7:
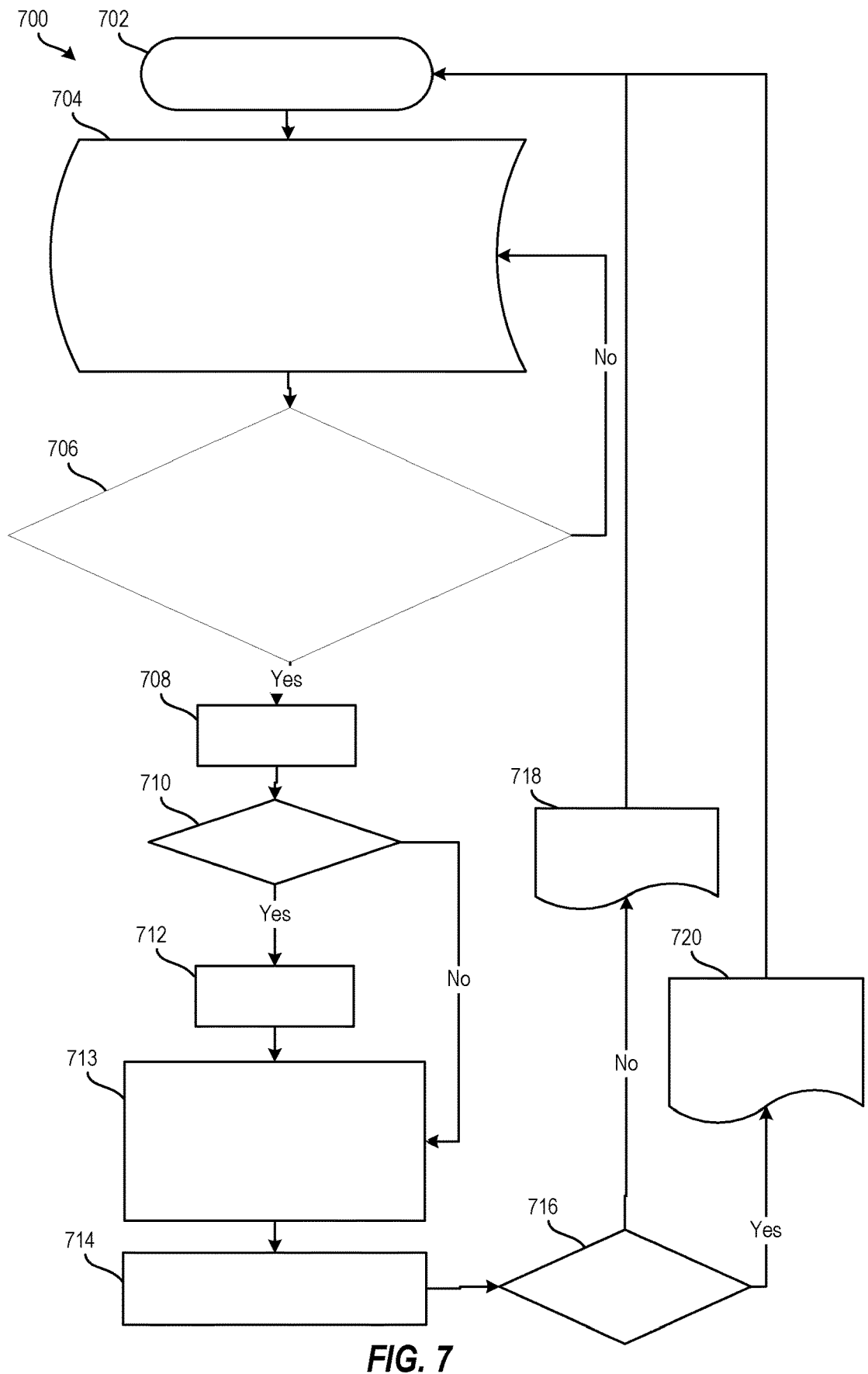
FIG. 7 depicts a flow diagram of a method for detecting toe and steering wheel misalignment of a vehicle (e.g., the vehicle of FIG. 4), according to aspects of the present disclosure.

FIG. 7 depicts a flow diagram of a method 700 for detecting toe misalignment of a vehicle (e.g., the vehicle 400), according to aspects of the present disclosure. The method 700 can be implemented by a suitable processing device or processing system, such as the processing system 1300 of FIG. 13, by an electronic steering system, or by another suitable system or device.

The toe alignment detection is activated at block 702 and the method 700 continues to block 704. At block 704, data is received that indicates straight-ahead driving, IMU accelerations and angular rates, vehicle speed, tire pressure, and environmental effects (e.g., wind speed, relative humidity, etc.). At block 706, a number of conditions are evaluated to determine whether the current driving condition, vehicle configuration, and environmental effects are acceptable for enabling the algorithm. For example, it is determined whether a straight/stable condition is present, whether the road is not a rough road, whether a yaw rate of the vehicle is small, whether the vehicle speed is within a certain range (e.g., between a lower vehicle speed V1 and an upper vehicle speed V2), whether the difference in left and right tire pressures are less than a threshold, whether the wind speed is less than an acceptable wind speed threshold, and whether the humidity is within an acceptable range. According to examples, as used in FIG. 7, $\gamma$ defines the acceptable wind speed threshold, $\delta$ and $\zeta$ are the acceptable humidity thresholds, V1 and V2 define vehicle speed thresholds, and $\varepsilon$ defines a left and right tire pressure difference threshold. If one or more of the conditions are met (in one example) or if all of these conditions are met (in another example), the method 700 proceeds to block 708. Otherwise, the method 700 returns to block 704.

At block 708, a steering wheel angle is corrected for road crown and road grade as described herein. It is then determined at block 710 whether the thrust angle is misaligned using the method 200 and/or the method 300 described herein. If so, the steering wheel angle is corrected for thrust angle misalignment at block 712. At block 713, a weight of W is assigned if data collected T seconds or less after a pothole or curb hitting event. Otherwise, a weight of 1 is assigned where W is greater than 1. The method 700 continues to block 714. If it is determined at block 710 that the thrust angle is not misaligned, the method 700 continues directly to block 714.

At block 714, a moving average of the corrected steering wheel angle is calculated. This can be accomplished using traditional averaging techniques. It is determined whether a deviation in the steering wheel angle (over time) is detected at block 716. If no deviation is detected at block 716, no toe misalignment is present at block 718; however, if it is determined that a deviation is detected at block 716, the toe angle or the steering wheel is concluded to be misaligned at block 720.

Additional processes also may be included, and it should be understood that the processes depicted in FIG. 7 represent illustrations and that other processes may be added or existing processes may be removed, modified, or rearranged without departing from the scope and spirit of the present disclosure.

The thrust misalignment detection and/or the toe and steering misalignment detection can be implemented by mitigating and correcting for environmental effects such as road crown and grade, crosswind and gusts, and vehicle tire and torque, etc.

For example, road crown and road grade can be considered and corrected for. Road crowns are designed mainly to assist with water dissipation on the road, and, hence, most roads have some degree of crown. The lateral angle from the crown and the road grade can tremendously affect the steering inputs (torque and angle). The present techniques utilize multiple estimation methods to estimate and correct for the effect of road crown and grade on both steering self-aligning torque (SAT) and angle. The estimation is performed by observing IMU data (e.g., lateral acceleration data).

Figure 8:
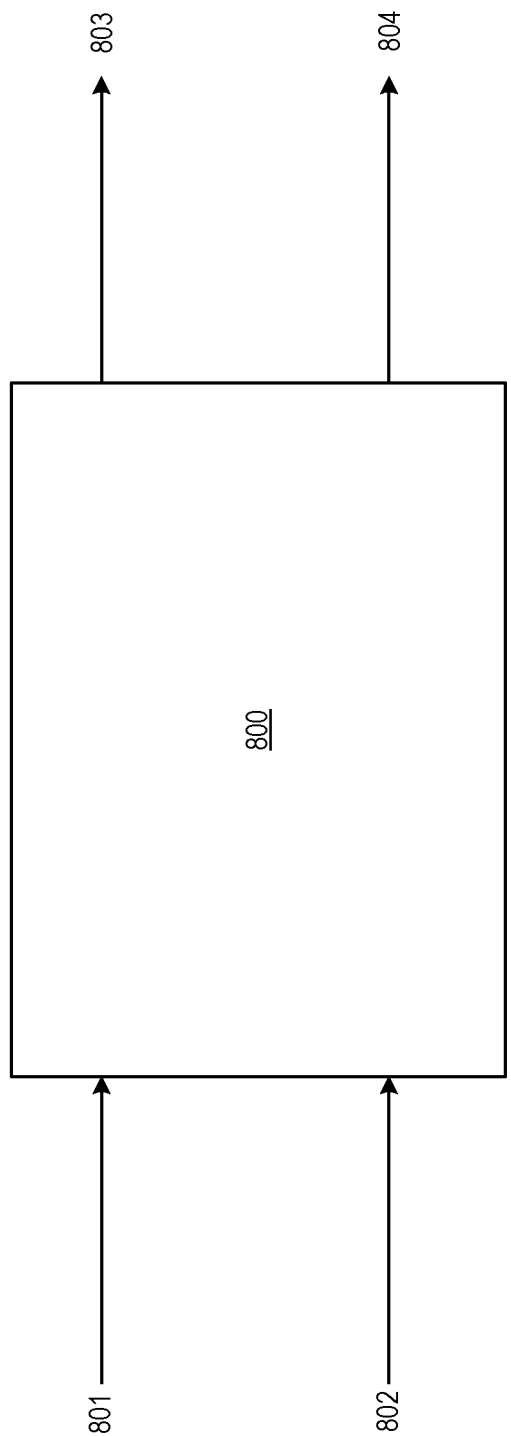
FIG. 8 depicts a block diagram of a road crown estimator, according to aspects of the present disclosure.

FIG. 8 depicts a block diagram of a road crown estimator 800, according to aspects of the present disclosure. In FIG. 8, SAT 801 represents the driver applied torque plus torque from the electronic power system (EPS), which is equal to $k(t)a_y^{IMU}$+corrected SAT.

In particular, the road crown estimator 800 can calculate the SAT due to road crown and grade as follows:

$$SAT \text{ due to crown \& grade} = mg \sin\phi\cos\theta \cdot l(t)$$
$$= m \cdot l(t) \cdot a_y^{IMU}$$
$$= k(t)a_y^{IMU}$$

where $\phi$ represents road crown, $\theta$ represents road grade, l represents tire pneumatic trail, m represents vehicle mass, g represents gravitational acceleration, and $a_y^{IMU}$ represents lateral acceleration of the vehicle. The road crown estimator 800 takes as inputs the SAT 801 and lateral acceleration 802 and produces as outputs (using the equations above) the value k(t) 803 and the corrected SAT 804. According to aspects of the present disclosure, a Kalman filter in conjunction with recursive least squares method can be used by the road crown estimator 800 to perform the estimation.

The crosswind and gusts are significant sources of noise for the thrust, toe, camber and caster misalignment methods described herein. This can be especially true for larger vehicles (e.g., trucks, buses, etc.). A crosswind causes a lateral force on the vehicle that the driver must steer into in order to maintain the desired path. Also, wind gusts bring more variation into the alignment calculations. One example provided herein provides for pausing the misalignment methods if the wind speed is more than some threshold (i.e., mitigation). Another example provides for using the vehicle heading provided by GPS to calculate the crosswind and compensate for it. For both examples, the present techniques propose two approaches for windy condition detection: Internet-based wind detection and vehicle dynamics-based wind detection.

For internet-based wind detection, first the vehicle GPS is used to pinpoint the vehicle location, then the vehicle onboard internet capability is used to access the available local weather information. In some examples, local weather information can be accessed via a computing device of the user (e.g., a smartphone, a tablet computer, etc.).

For vehicle dynamics-based wind detection, either a SAT to heading change can be detected, or a yaw rate variation can be detected. A SAT to heading change detection is based on the concept that on a windy day the corrected SAT will change with the vehicle heading because the local crosswind to the vehicle will change with a vehicle heading. This technique is capable of detecting the steady portion of wind speed. An X of Y method is used to make a confident decision. The conclusive events are detected when the vehicle heading is changed considerably and remains stable for a long enough period of time to make sure the algorithm is robust against the effect of the other noises.

Yaw rate variation detection can also be based on the IMU of the vehicle to mitigate for the wind gust effect. A wind gust refers to the transient portion of the wind which is often stronger and faster than the steady-state part. Wind gusts usually cause the vehicle to deviate momentarily from its straight ahead course and cause a yaw motion before the driver reacts and corrects the course. The yaw rate is cross-checked against the steering wheel angle and its gradient. Once the steering wheel angle and its gradient are stable and small, the yaw rate provided by IMU is monitored. The number of times the yaw rate and yaw acceleration exceed a predefined threshold is counted over a specific period of time to make a conclusion about the wind gust condition. In some examples, when the gusty condition is detected, the thrust misalignment, camber misalignment, caster misalignment and/or toe misalignment is paused to mitigate for the gust or any other disturbances that cause a sudden lateral movement.

Vehicle and tire torque detection can also occur. Even for a fully aligned vehicle, there can still be some small amount of self-aligning torque at the higher speeds generated by the vehicle and the tires. This is referred to as vehicle residual aligning torque (VRAT) and plysteer residual aligning torque (PRAT). This effect can be accounted for in the camber and caster misalignment detection as an offset value (calibrated value for specific vehicle geometry and tire construction). This offset initial self-aligning torque will be used as an input bias to correct the self-aligning torque for vehicle and tire effects.

In another example, after the alignment is performed on the vehicle or the tires are changed or rotated, a self-calibration mode can be used then for some specific time afterward whatever the algorithm reads/measures as the steering torque is deemed to be due to the vehicle and tire torque. The measured torque at this mode is set as a bias and any deviation from that afterward will be treated as the misalignment. This provides robustness against the tire and vehicle torque.

Humidity and/or rain can also affect alignment detection. For example, humidity can affect the accuracy of the present techniques through affecting the road surface characteristics such as friction. One example to solve this is to use the engine inlet humidity sensor and pause the alignment detection when humidity is beyond some threshold. The humidity information can also be obtained using the Internet capabilities of the vehicle similar to the Internet-based wind detection.

Road roughness and other environmental and non-environmental effects can add more noise into the collected data. To ensure that the noisy data are not collected, a stability detection algorithm is used to monitor the IMU data and wheel speed sensor data. For example, a rough road condition causes the speed and acceleration components to become volatile. Once an unstable condition is detected, it is mitigated by momentarily pausing the alignment detection techniques.

In yet another example, the events that can potentially cause misalignment, e.g. driving over a pothole or hitting a curbside, can also be monitored. When such events are detected, the alignment detection techniques compare SAT and SWA corresponding to before and after the event and any sudden change is concluded to be due to misalignment caused by the event. This feature provides more confidence for the misalignment detection techniques described herein. Such events can be detected by separate dedicated functions for pothole and curb detection. Another method for detecting such events that can potentially lead to misalignment could be, for example, monitoring the wheel speed sensor (WSS) signal (and its frequency contents) as well as the IMU accelerations.

Figure 9:
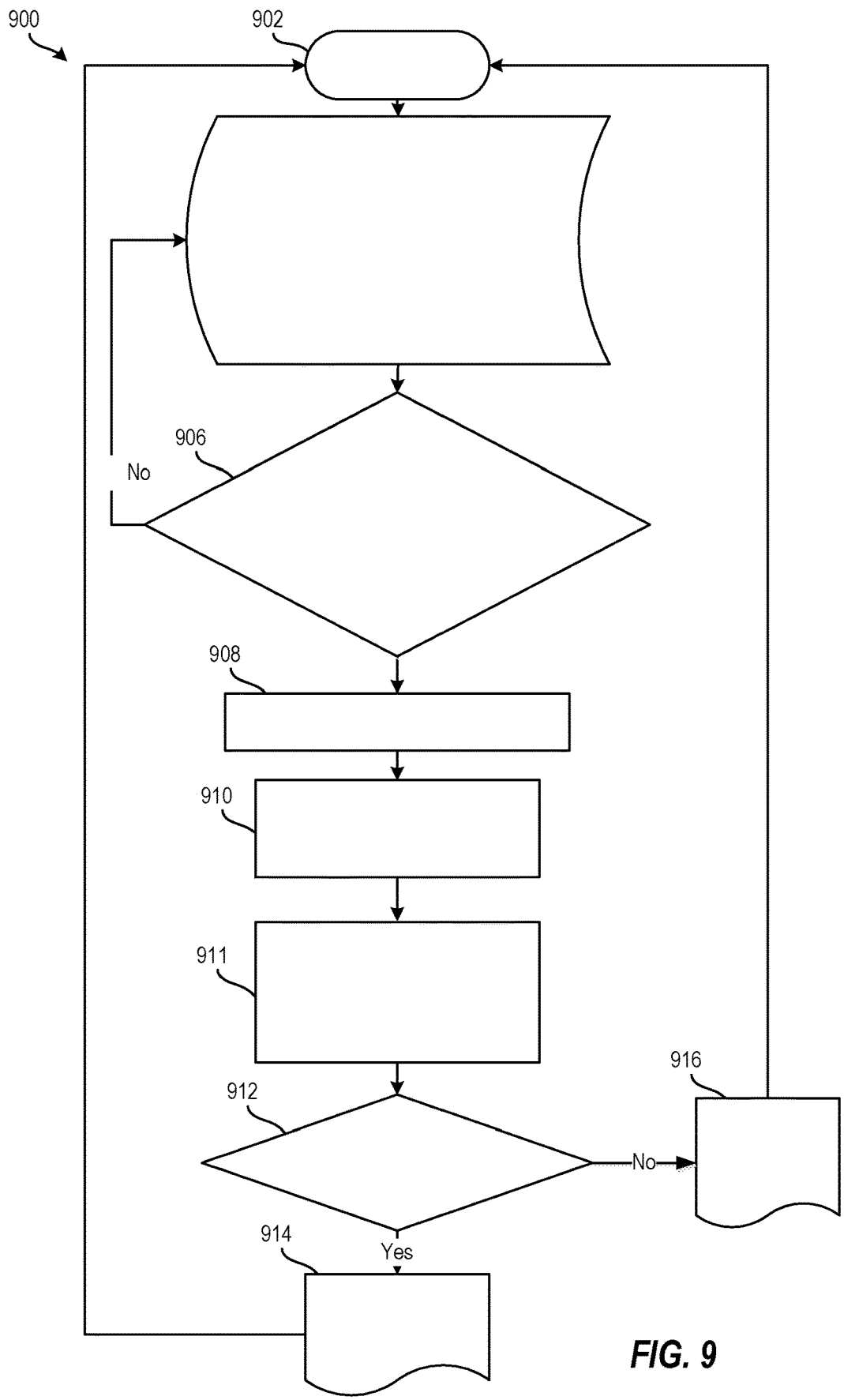
FIG. 9 depicts a flow diagram of a method for camber and caster misalignment detection, according to aspects of the present disclosure.

The SAT can be used to aid camber and caster misalignment detection. Camber angle is the angle made by the wheels of the vehicle (i.e., the angle between the vertical axis of the wheels used for steering and the vertical axis of the vehicle when viewed from the front/rear. Caster angle is the angle between the steering axis and vertical axis of the vehicle when viewed from the side of vehicle. FIG. 9 depicts a flow diagram of a method 900 for camber and caster misalignment detection, according to aspects of the present disclosure. The method 900 can be implemented by a suitable processing device or processing system, such as the processing system 1300 of FIG. 13, by an electronic steering system, or by another suitable system or device.

The camber and caster alignment detection is activated at block 902, and the method 900 continues to block 904. At block 904, data is received that indicates straight-ahead driving, IMU accelerations and angular rates, vehicle speed, tire pressure, and environmental effects (e.g., wind speed, relative humidity, etc.).

At block 906, a number of conditions are evaluated to determine whether to calculate SAT. For example, it is determined whether a straight/stable condition is present, whether the road is not a rough road, whether a yaw rate of the vehicle is small, whether the vehicle speed is within a certain range (e.g., between a lower vehicle speed V1 and an upper vehicle speed V2), whether the difference in left and right tire pressures are less than a threshold, whether the wind speed is less than an acceptable wind speed threshold, and whether the humidity is within an acceptable range. According to examples, as used in FIG. 9, γ defines the acceptable wind speed threshold, δ and ζ are the acceptable humidity thresholds, V1 and V2 define vehicle speed thresholds, and ε defines a left and right tire pressure difference threshold. If one or more of the conditions are met (in one example) or if all of these conditions are met (in another example), the method 900 proceeds to block 908. Otherwise, the method 900 returns to block 904.

At block 908, the SAT is calculated as the driver applied torque plus the EPS applied torque as described herein. At block 910, the SAT is corrected for road crown, vehicle torque, and/or tire torque. At block 911, a weight of W is assigned if data collected T seconds or less after a pothole or cub hitting event. Otherwise, a weight of 1 is assigned where W is greater than 1. At block 912, it is determined whether absolute value of the corrected SAT is greater than the acceptable SAT threshold. If so, the wheel camber and/or caster is considered misaligned at block 914, and if not, the wheel camber and caster angles are considered acceptable at block 916.

Figure 10:
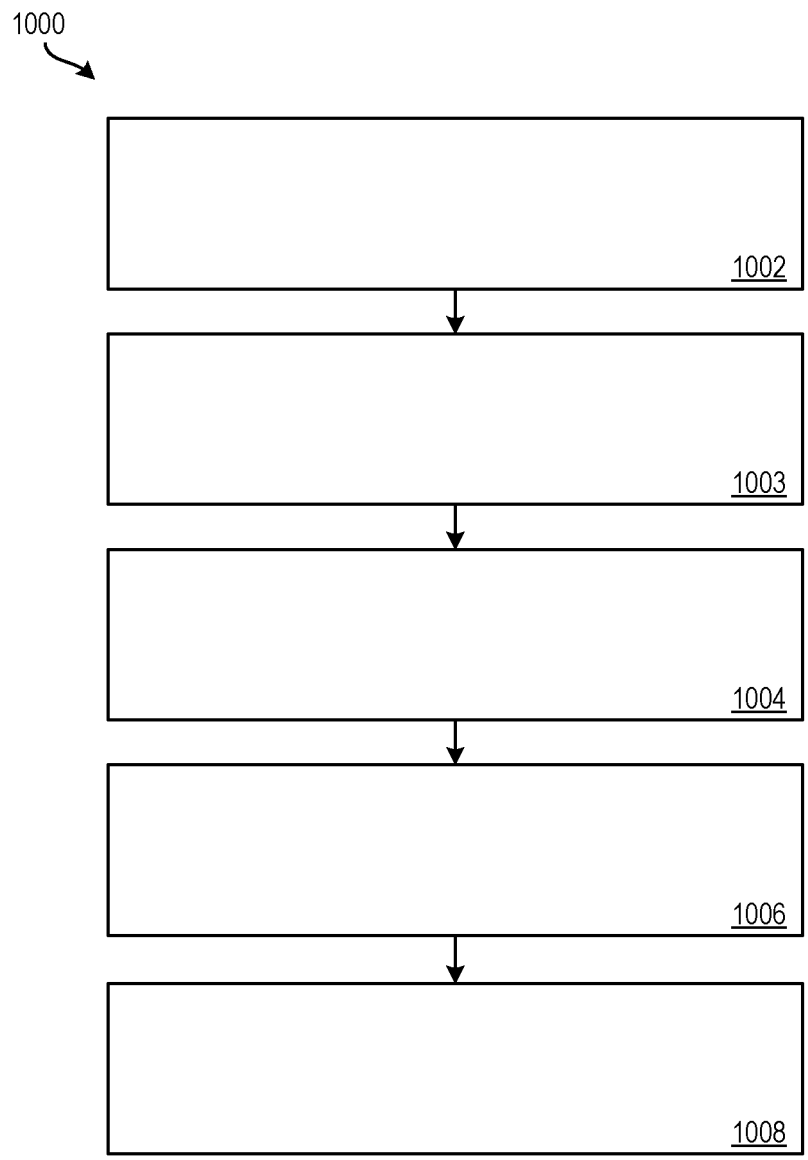
FIG. 10 depicts a flow diagram of a method for camber and caster misalignment detection, according to aspects of the present disclosure.

FIG. 10 depicts a flow diagram of a method 1000 for camber and caster misalignment detection, according to aspects of the present disclosure. The method 1000 can be implemented by a suitable processing device or processing system, such as the processing system 1300 of FIG. 13, by an electronic steering system, or by another suitable system or device.

At block 1002, a processing device (e.g., the processor 1121) calculates a self-aligning torque based at least in part on a driver applied torque and an electronic power system (EPS) torque. At block 1003, the processing device mitigates for driving trajectory, longitudinal acceleration, and rough road conditions as described herein. As used herein, mitigation describes a pause of the algorithm (e.g., the method 1000, etc.) when one or more vehicle effects and/or environmental effects exceeds a threshold. The vehicle effects include speed, loading, trajectory, tire pressure, tire wear, etc. The environmental effects include road crown/grade, wind/gust, humidity, rough road conditions, etc.

At block 1004, the processing device corrects the SAT for environmental effects (e.g., road crown, vehicle torque, tire torque, etc.). At block 1006, the processing device detects at least one of a camber and a caster misalignment by determining whether absolute value of the corrected SAT is greater than (or greater than or equal to) a threshold. At block 1008, the vehicle camber and caster misalignment is reported.

Additional processes also may be included, and it should be understood that the processes depicted in FIG. 1000 represent illustrations and that other processes may be added or existing processes may be removed, modified, or rearranged without departing from the scope and spirit of the present disclosure.

Figure 11:
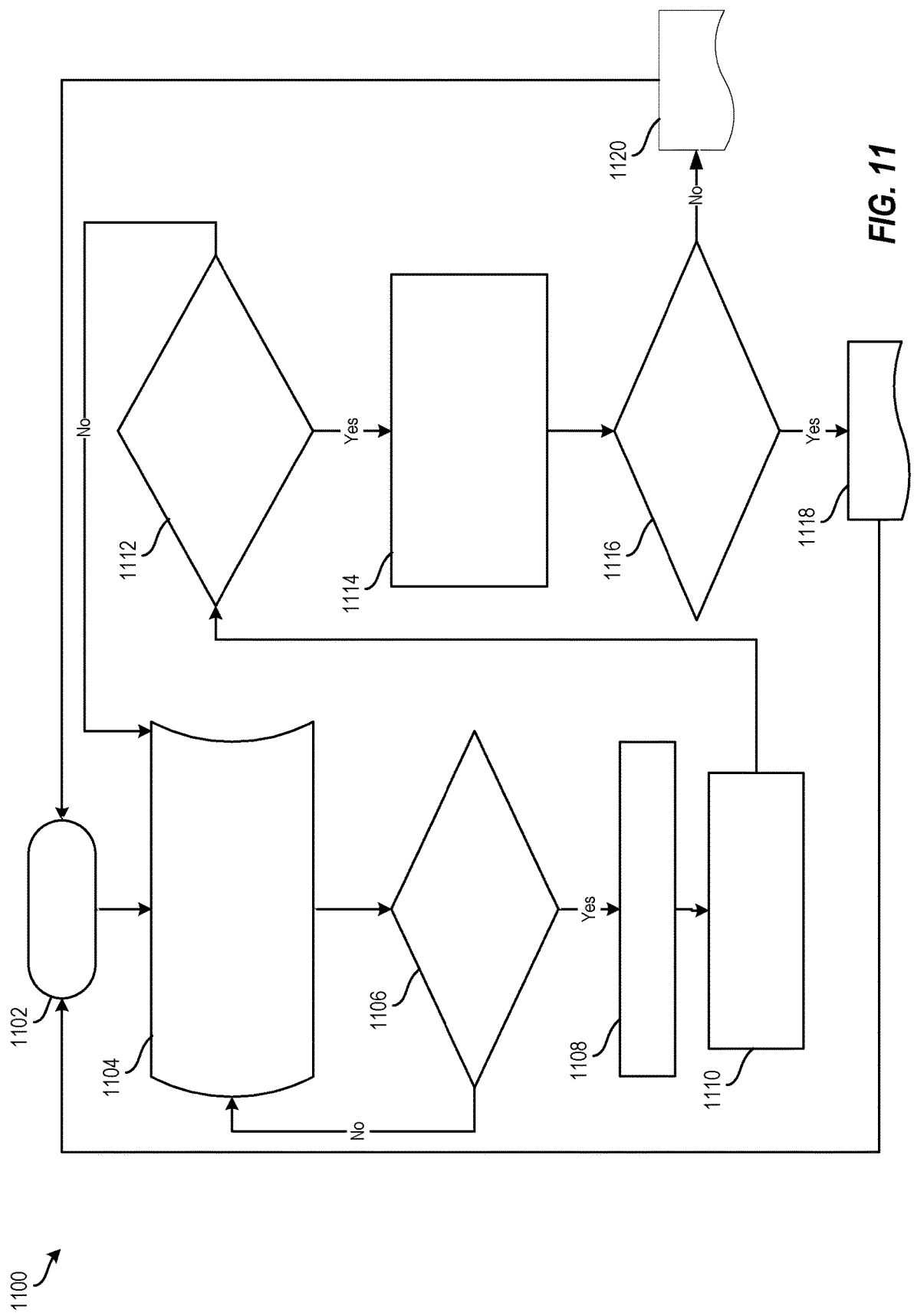
FIG. 11 depicts a flow diagram of a method for windy condition detection, according to aspects of the present disclosure.

FIG. 11 depicts a flow diagram of a method for windy condition detection, according to aspects of the present disclosure. The method 1100 can be implemented by a suitable processing device or processing system, such as the processing system 1300 of FIG. 13, by an electronic steering system, or by another suitable system or device.

At block 1102, windy condition detection is activated, and the method 1100 continues to block 1104. At block 1104, data is received that indicates straight-ahead driving, IMU accelerations and angular rates, vehicle speed, vehicle heading, driver applied torque, and/or EPS applied torque. At block 1106, a number of conditions are evaluated, such as whether straight/stable conditions are present, whether the road is a rough road, whether the vehicle speed is within a predefined range, etc. If the conditions at block 1106 are not met, the method 1100 returns to block 1104.

If one or more of the conditions (or all of the conditions in an example) at block 1106 are met, SAT is calculated based on the driver applied torque and EPS applied torque at block 1108. The SAT is then corrected for road crown, vehicle torque, tire torque, etc. at block 1110, and it is then determined whether the vehicle heading is within a range (e.g., between H1 and H2 thresholds) for a period of time (e.g., for at least the last T seconds) at block 1112. If not, the method 1100 returns to block 1104. However, if it is determined that the vehicle heading is within the range at block 1112, the method 1100 proceeds to block 1114 and a moving average of the SAT and vehicle heading are calculated and the current average version of the SAT and heading are registered as being a stable event. At block 1116, the stable events are compared to determine whether the SAT is changing with respect to the vehicle heading. If so, a windy condition is present (block 1118); if not, a windy condition is not present (block 1120). In either case, the method 1100 can return to block 1102 and repeat.

Figure 12:
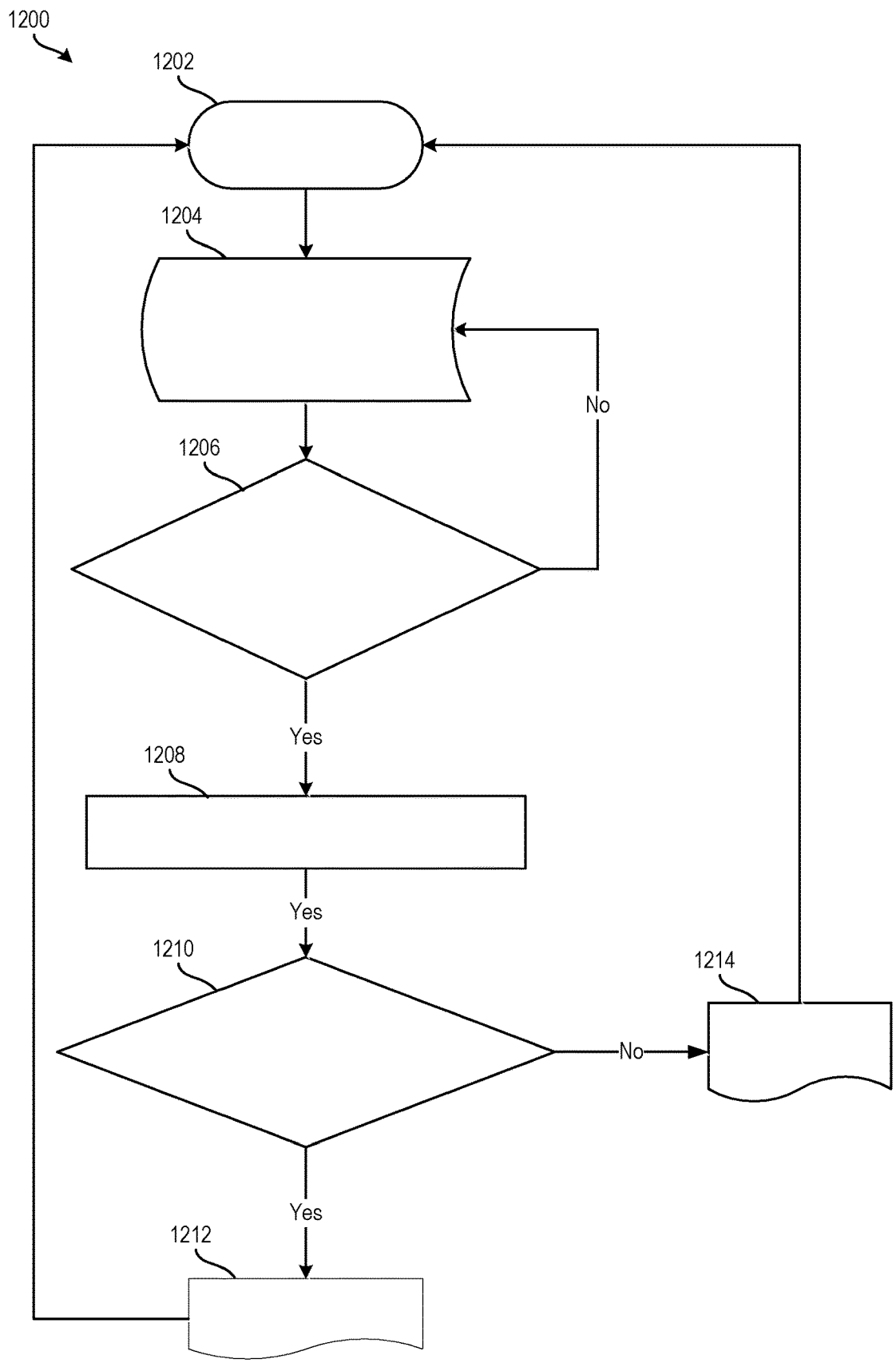
FIG. 12 depicts a flow diagram of a method for wind gust detection, according to aspects of the present disclosure.

FIG. 12 depicts a flow diagram of a method for wind gust detection, according to aspects of the present disclosure. The method 1200 can be implemented by a suitable processing device or processing system, such as the processing system 1300 of FIG. 13, by an electronic steering system, or by another suitable system or device.

At block 1202, gusty condition detection is activated, and the method 1200 continues to block 1204. At block 1204, data is received that indicates yaw rate (received, for example, from the IMU), vehicle speed, and/or steering wheel angle, etc. At block 1206, a number of conditions are evaluated, such as whether the yaw rate is above a threshold, whether the steering wheel angle is stable, whether road is a rough road, whether the vehicle threshold is within a range (e.g., between V1 and V2), etc. If the conditions at block 1206 are not met, the method 1200 returns to block 1204.

If one or more of the conditions (or all of the conditions in an example) at block 1206 are met, a number of gust events is counted (i.e., incremented) at block 1208, and it is determined whether a number of gust events over a period (e.g., the last T seconds) is more than a threshold (e.g., X) at block 1210. If the number of gusts is greater than the threshold, a gusty condition is present (block 1212); if the number of gusts is less than the threshold, a gusty condition is not present (block 1214). In either case, the method 1200 can return to block 1202 and repeat.

Figure 13:
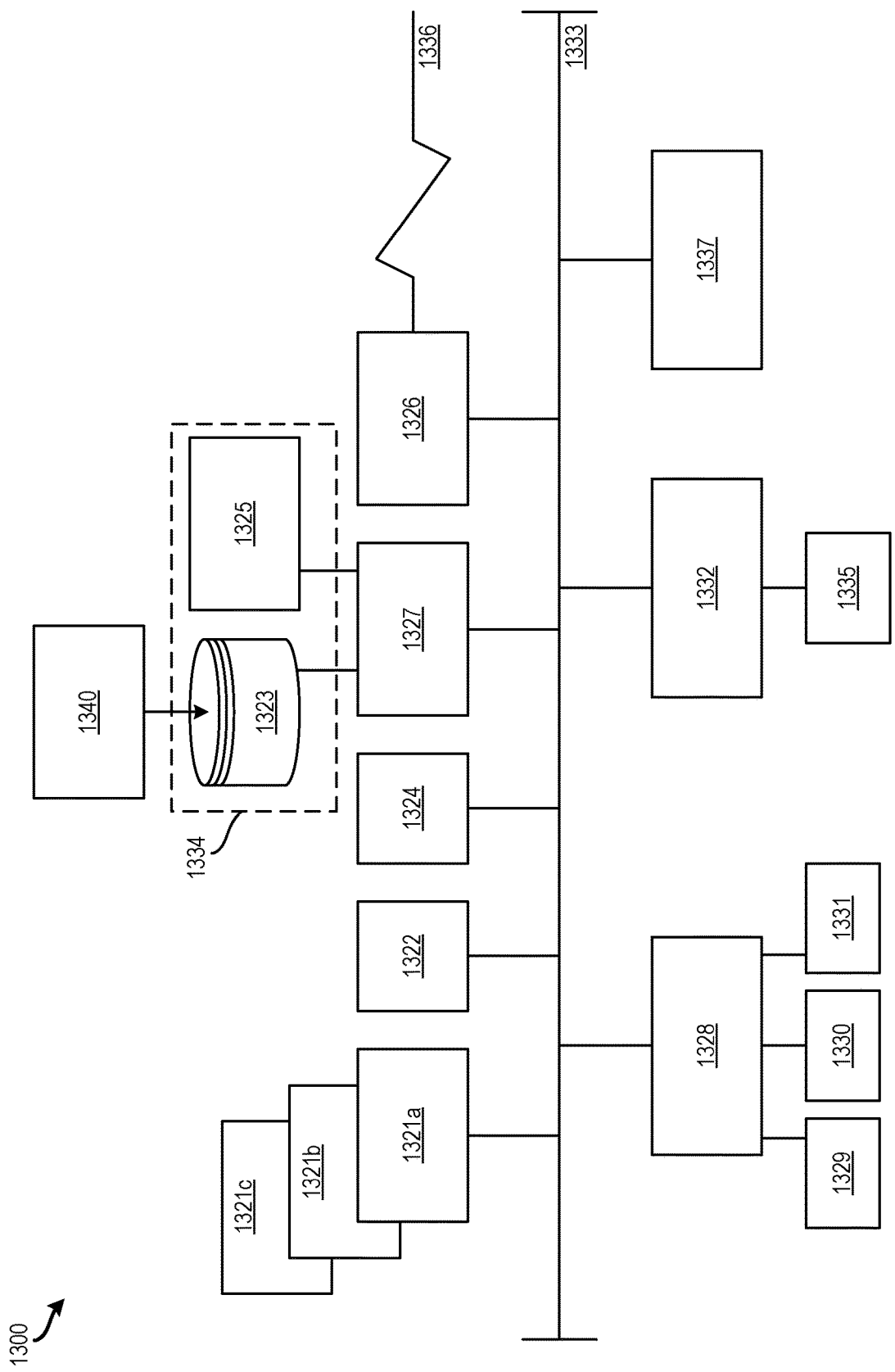
FIG. 13 depicts a block diagram of a processing system for implementing the techniques described herein, according to aspects of the present disclosure.

It is understood that the present disclosure is capable of being implemented in conjunction with any other type of computing environment now known or later developed. For example, FIG. 13 illustrates a block diagram of a processing system 1300 for implementing the techniques described herein. In examples, processing system 1300 has one or more central processing units (processors) 1321a, 1321b, 1321c, etc. (collectively or generically referred to as processor(s) 1321 and/or as processing device(s)). In aspects of the present disclosure, each processor 1321 can include a reduced instruction set computer (RISC) microprocessor. Processors 1321 are coupled to system memory (e.g., random access memory (RAM) 1324) and various other components via a system bus 1333. Read only memory (ROM) 1322 is coupled to system bus 1333 and can include a basic input/output system (BIOS), which controls certain basic functions of processing system 1300.

Further illustrated are an input/output (I/O) adapter 1327 and a network adapter 1326 coupled to system bus 1333. I/O adapter 1327 can be a small computer system interface (SCSI) adapter that communicates with a hard disk 1323 and/or other storage drive 1325 or any other similar component. I/O adapter 1327, hard disk 1323, and storage device 1325 are collectively referred to herein as mass storage 1334. Operating system 1340 for execution on processing system 1300 can be stored in mass storage 1334. A network adapter 1326 interconnects system bus 1333 with an outside network 1336 enabling processing system 1300 to communicate with other such systems.

A display (e.g., a display monitor) 1335 is connected to system bus 1333 by display adaptor 1332, which can include a graphics adapter to improve the performance of graphics and general computation intensive applications and a video controller. In one aspect of the present disclosure, adapters 1326, 1327, and/or 1332 can be connected to one or more I/O buses that are connected to system bus 1333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1333 via user interface adapter 1328 and display adapter 1332. A keyboard 1329, mouse 1330, and speaker 1331 can be interconnected to system bus 1333 via user interface adapter 1328, which can include, for example, a Super I/O chip integrating multiple device adapters into a single integrated circuit.

In some aspects of the present disclosure, processing system 1300 includes a graphics processing unit 1337. Graphics processing unit 1337 is a specialized electronic circuit designed to manipulate and alter memory to accelerate the creation of images in a frame buffer intended for output to a display. In general, graphics processing unit 1337 is very efficient at manipulating computer graphics and image processing, and has a highly parallel structure that makes it more effective than general-purpose CPUs for algorithms where processing of large blocks of data is done in parallel.

Thus, as configured herein, processing system 1300 includes processing capability in the form of processors 1321, storage capability including system memory (e.g., RAM 1324), and mass storage 1334, input means such as keyboard 1329 and mouse 1330, and output capability including speaker 1331 and display 1335. In some aspects of the present disclosure, a portion of system memory (e.g., RAM 1324) and mass storage 1334 collectively store an operating system to coordinate the functions of the various components shown in processing system 1300.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for detecting a windy condition, the method comprising:
   receiving, by a processing device, vehicle data and environmental data including a vehicle heading, a driver applied torque on a steering wheel, and an electronic power steering (EPS) applied torque on a steering rack;
   mitigating, by a processing device, for vehicle and environmental effects;
   calculating, by a processing device, a self-aligning torque (SAT) based at least in part on a driver applied torque and the EPS applied torque;
   calculating, by the processing device, a moving average of the SAT and the vehicle heading;
   correcting, by the processing device, the SAT for the environmental effects;

detecting, by the processing device, the windy condition by determining whether the SAT changes with respect to the vehicle heading; and reporting the windy condition based at least in part on determining that the SAT changed with respect to the vehicle heading.

2. The computer-implemented method of claim 1, wherein the environmental effects comprise at least one of a road crown, a vehicle torque, and a tire torque.

3. The computer-implemented method of claim 1, wherein determining whether the SAT changes with respect to the vehicle heading is based at least in part on the moving average of the SAT and the vehicle heading.

4. A computer-implemented method for detecting a windy condition, the method comprising:

receiving, by a processing device, vehicle data and environmental data including a vehicle heading and a steering wheel angle (SWA);

mitigating, by a processing device, for vehicle and environmental effects;

calculating, by a processing device, a moving average steering wheel angle (SWA) based at least in part on a steering wheel angle;

correcting, by the processing device, the SWA for the environmental effects;

detecting, by the processing device, the windy condition by determining whether the moving average SWA changes with respect to the vehicle heading; and reporting the windy condition based at least in part on determining that the moving averaged SWA changed with respect to the vehicle heading.

5. A computer-implemented method for detecting a gusty condition, the method comprising:

receiving, by a processing device, vehicle data and environmental data including a yaw rate and a steering wheel angle;

mitigating, by a processing device, for vehicle and environmental effects;

detecting, by the processing device, the gusty condition by counting a number of times the yaw rate and a yaw acceleration exceed a predefined threshold over a specific period of time when a steering wheel is stable and within a threshold; and reporting the gusty condition based at least in part on exceeding the threshold.

6. The computer-implemented method of claim 5, further comprising:

determining, by the processing device, whether a condition is met prior to counting the number of times the yaw rate and the yaw acceleration exceed a predefined threshold over a specific period of time when a steering wheel is stable and within the threshold.

7. The computer-implemented method of claim 6, wherein the condition is one or more of whether the yaw rate and a yaw acceleration are above a threshold, whether the steering wheel angle is stable, whether a road is a rough road, and whether a vehicle velocity threshold of a vehicle is within a defined range and whether the vehicle is initially moving on a straight path.

8. A computer-implemented method for road crown and grade correction, the method comprising:

receiving, by a processing device, vehicle data and environmental data including inertial measurement unit (IMU) lateral acceleration data associated with the vehicle;

estimating, by the processing device, an effect of road crown and grade on a self-aligning torque (SAT) based at least in part on the self-aligning torque (SAT) and the lateral acceleration data; and generating, by the processing device, a corrected SAT based at least in part on the effect of road crown and grade on the SAT.

9. The computer-implemented method of claim 8, wherein estimating the effect of road crown and grade on the SAT is performed using a Kalman filter.

10. The computer-implemented method of claim 8, wherein estimating the effect of road crown and grade on the SAT is performed using a Kalman filter in conjunction with a recursive least squares method.

11. A computer-implemented method for misalignment event detection, the method comprising:

monitoring, by a processing device, a self-aligning torque (SAT) and a steering wheel angle (SWA) of a vehicle;

detecting, by the processing device, an occurrence of a misalignment event that can cause a misalignment of the vehicle;

responsive to detecting the occurrence of the misalignment event, determining, by the processing device, whether a misalignment of the vehicle occurred by determining whether at least one of the SAT and the SWA experiences a sudden change;

reporting the misalignment event based at least in part on determining that at least one of the SAT and the SWA experiences a sudden change; and gathering, by the processing device, data subsequent to the occurrence of the misalignment event.

12. The method of claim 11, wherein the misalignment event is at least one of the vehicle hitting a pothole and the vehicle hitting a curb.

\* \* \* \* \*